UNITED STATES PATENT OFFICE.

STERLING W. CAMP, OF BINGHAMTON, NEW YORK.

PAINT FOR MASONRY.

1,365,372. Specification of Letters Patent. Patented Jan. 11, 1921.

No Drawing. Application filed January 31, 1919. Serial No. 274,356.

*To all whom it may concern:*

Be it known that I, STERLING W. CAMP, a citizen of the United States, residing at Binghamton, in the county of Broome and State of New York, have invented certain new and useful Improvements in Paint for Masonry, of which the following is a specification.

My invention consists in a composition of matter to be used for cleaning and redressing the outer surface of stone, cement, and other like materials and surfaces. My composition of matter consists of the following ingredients combined as hereinafter described. Lead, solax, varnish, linseed oil, drier, and turpentine in proportions as hereinafter described. The ingredients are to be thoroughly commingled together, cold, by agitation, mixing in any convenient receptacle, by stirring or any other convenient method. The proportions may be as follows, in the combination. For one gallon of my composition I have 5 lbs. of lead, 3 lbs. of solax, 1 pint of varnish, one half pint of linseed oil, one half pint of drier, and one half gallon of turpentine. In the application of my composition or use of the same, I apply the composition to any stone, cement or other similar outer surface, with an ordinary paint brush, which application results in a cleansing and redressing of the surface and hardening of the same, and protection of the same from the effects of the elements. This composition is most useful for stone, brick and cement surfaces of all kinds, when applied with a brush as before stated.

The lead employed in my composition is preferably white lead, such as Jewett's white lead. Solax is an ingredient which contains substantially ninety-nine per cent. of pure silica.

I claim:

1. The herein described composition of matter consisting of white lead, silica, varnish, linseed oil, drier and turpentine.

2. The herein described composition of matter consisting of 5 parts white lead, 3 parts silica, 1 part varnish, 1 part linseed oil, 1 part drier, 1 part turpentine, substantially as set forth.

In testimony whereof I have affixed my signature.

STERLING W. CAMP.